United States Patent Office 2,800,200
Patented July 23, 1957

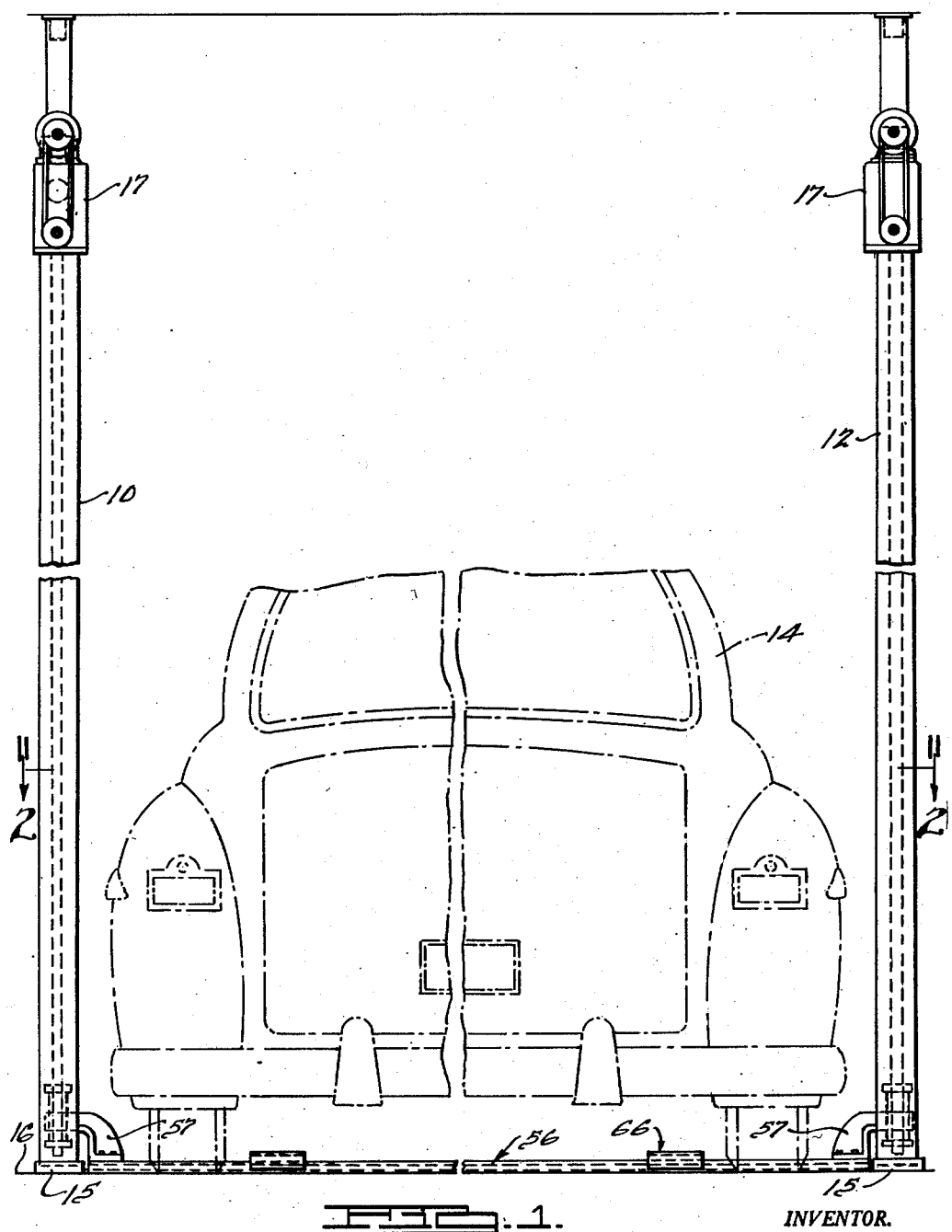

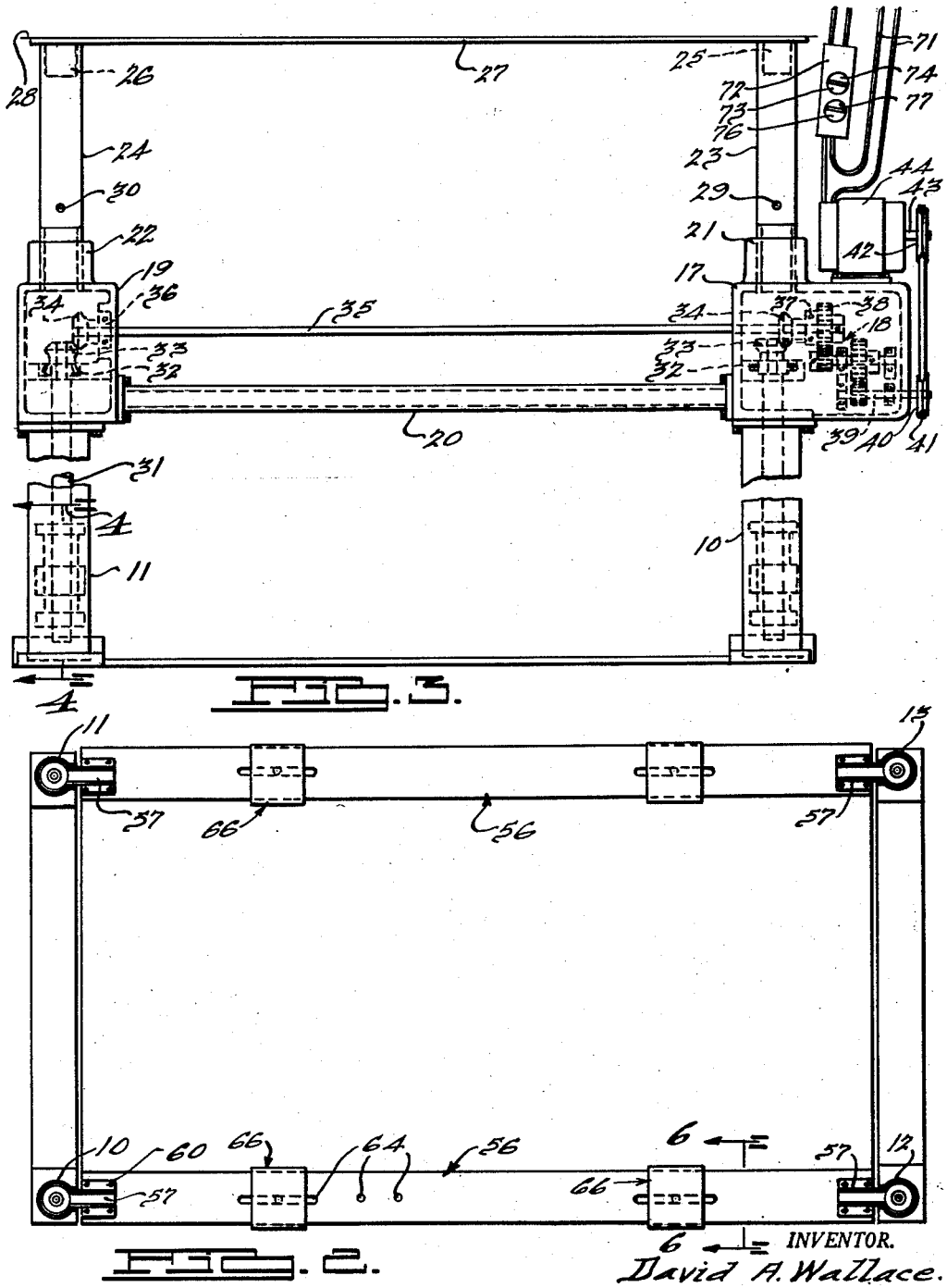

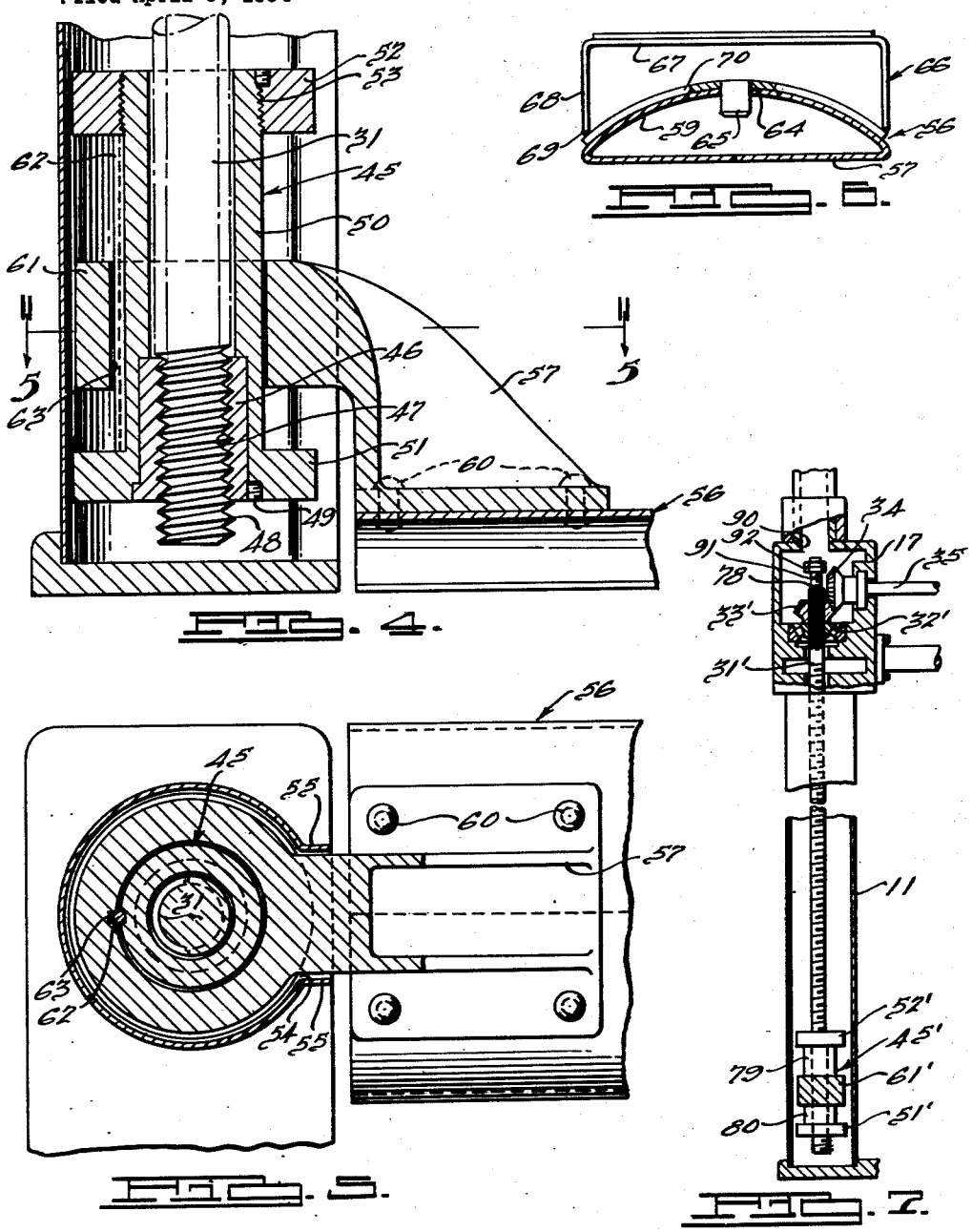

2,800,200

HOISTING APPARATUS FOR VEHICLES

David A. Wallace, Grosse Pointe Farms, Mich.

Application April 9, 1954, Serial No. 422,014

5 Claims. (Cl. 187—8.59)

This invention relates to improved hoisting apparatus. More particularly, the invention relates to improvements in vehicle hoisting apparatus of the type which is adapted to be accommodated entirely above the floor level.

One of the main objects of the invention is to provide a screw type hoisting apparatus of improved and economical design which can be constructed from parts of substantially standard design and slight modifications of such parts.

Another object of the invention is to provide nut and screw type actuating mechanism in a hoist of this kind which is adapted to allow substantial overtravel of the driving parts of the mechanism after the load receiving seat structure thereof has come to rest at its lowermost position in order to avoid excessive stressing of the apparatus and to accommodate simple and effective control of the driving parts of the mechanism.

A still further object of the invention is to provide an improved load receiving seat structure for hoisting apparatus of this kind which is exceedingly strong and rigid and of relatively light weight.

An additional object of the invention is to provide improved connection between the actuating mechanism and the load receiving seat structure of such hoisting apparatus.

An illustrative embodiment of the invention is shown in the accompanying drawings in which:

Fig. 1 is an end elevational view of hoisting apparatus embodying the invention.

Fig. 2 is a horizontal sectional view taken on line 2—2 of Fig. 1.

Fig. 3 is a fragmentary side elevational view of the hoisting apparatus shown in Fig. 1.

Fig. 4 is a fragmentary vertical sectional view taken on line 4—4 of Fig. 3.

Fig. 5 is a fragmentary horizontal sectional view taken on line 5—5 of Fig. 4.

Fig. 6 is a vertical sectional view of the load receiving support of the hoisting apparatus taken on line 6—6 of Fig. 2.

Fig. 7 is a fragmentary vertical sectional view of one post of hoisting apparatus embodying a modified form of the invention.

In the form of the invention illustrated in Figs. 1 to 6, inclusive, my improved hoisting apparatus comprises two spaced pairs of posts, the left hand pair of which are numbered 10 and 11 and the right hand pair of which are numbered 12 and 13 as indicated in Fig. 2. The pairs of posts 10 and 11 and 12 and 13, respectively, are spaced apart, as illustrated in Fig. 1, sufficiently to accommodate between them a vehicle designated by the numeral 14. It will be seen that the vehicle is widthwise receivable between the parallelly arranged pairs of posts. The posts 10 to 13 are mounted on feet 15 which are seated upon the floor 16 and the posts 10 and 12 are provided at their upper ends with casings 17 in which conventional gear reduction mechanism, generally designated by the numeral 18, is contained. The posts 11 and 13 are provided at their upper ends with casings 19. The casings 17 and 19 are connected together by a tubular strut 20 as illustrated in Fig. 3. The upper ends of the casings 17 and 19 are provided with threaded collars 21 and 22, respectively, in which are threaded screw type jack support elements 23 and 24, respectively. The threaded jack elements 23 and 24 have open upper ends in which are received downwardly extending studs 25 and 26 which are provided on a ceiling mounted cross bar 27 that is adapted to be disposed against the ceiling 28 of the room in which the hoisting apparatus is installed. The jack elements 23 and 24 are provided with apertures 29 and 30 for receiving a bar by which they may be rotated to firmly clamp the posts between the floor and ceiling of the room.

Disposed in each post 10, 11, 12 and 13 is a threaded screw element 31 which is journalled in a bearing 32 provided within the casings 19 of the posts 11 and 13 and the casings 17 of the posts 10 and 12. Fixed to the upper ends of each of the screw members 31 is a bevel gear 33 which meshes with a bevel gear 34 that is fixed to a cross shaft 35 extending parallel to the tubular strut 20. The opposite end portions of the shaft 35 are journalled in bearings 36 and 37 located in the casings 19 and 17, respectively. The shaft 35 is also provided with a spur gear 38 within the gear casing 17 which is meshed with the chain of reduction gears generally designated by the numeral 18. The reduction gear chain 18 has a shaft 39 which is provided with a pulley 40 that is connected by a belt 41 with a pulley 42 on the shaft 43 of an electric motor 44 as shown in Fig. 3. The motor 44 is of the reversing type and it is mounted upon the upper side wall of the gear casing 17.

A nut element, generally designated by the numeral 45, is threaded on each screw member 31 as shown in Fig. 4. The nut member 45 includes a bushing 46 having threads 47 engaged upon the threads 48 of the screw member 31. This bushing 46 is fixed by set screws 49 within a spool 50 having a flange 51 at its lower end and a removable flange 52 at its upper end that is attached to the body of the spool 50 by threads 53. The outer peripheries of the flanges 51 and 52 relatively loosely fit within the inner diameter of the tubular posts 10, 11, 12 and 13 which are preferably formed of sheet metal and provided with longitudinally extending slots 54 as illustrated in Fig. 5. The slots 54 of the posts 10 and 12 are formed in their facing sides and the slots 54 of the posts 11 and 13 are formed in the facing sides of these two posts. The metal of the wall structure of the posts adjacent the slots 54 is bent outwardly on respectively opposite sides of the slots to provide guide flanges 55. It should be understood that the construction of all of the posts in this respect is identical.

The improved hoisting apparatus is provided with a pair of tubular sheet metal load receiving seat structures, generally designated by the numeral 56 in Fig. 6, which includes a lower substantially flat side 57 that is adapted to seat upon a correspondingly flat floor and an upper externally concaved rounded side or wall 59. This seat structure 56 is preferably formed of seamless tubing but it could very well be made from two or more pieces welded together, as for example, at the junctions of the convexed top side 59 and flat bottom side 57. There is a load receiving seat structure 56 extending between the posts 10 and 12 and between the posts 11 and 13, respectively. The ends of the seat structures 56 are provided with outwardly extending brackets 57 which are fixed to the seat structure in any suitable manner, as for example, by rivets 60. The brackets 57 extend through the slots 54 in these posts in close relationship to the guide flanges 55 which hold the seat structure 56 against rotation and swinging. The outer ends of the brackets 57 are provided with ring-shaped outer extremities 61 in which are received the body portions of the spools 50 as shown in Fig. 4. A key 62 provided in a groove formed in the exterior of the body portions of each spool 50 is also received in a groove 63 formed in the ring-shaped end portions 61 of each bracket 57. The key 62 prevents relative rotation between the entire nut element 45 and each bracket 57. Inasmuch as this structure is the same at each post of the hoisting apparatus, a description of one will serve for all.

The upper concave wall 59 of the load receiving seat 56 is provided with longitudinally spaced apertures and slots 64 for receiving a pin 65 provided on the lower side of a vehicle contacting pad generally designated by the numeral 66. There are four contact pads provided, each of which are arranged to engage frame portions of a vehicle between the front and rear wheels thereof and each contact pad 66 is formed of sheet metal and comprises an upper section 67 of U-shaped cross section having the outer extremities of its legs 68 welded at 69 to the ends of an externally concave lower side wall 70 from which the pins 65 extend downwardly. The concave lower wall 70 conforms in shape to the convexed upper wall 59 of the seat structure. The contact pads 66 may be moved from place to place in order to accommodate the lifting of vehicles of different sizes and constructions.

As previously pointed out, there are two motors 44 for each pair of posts 10 and 11 are provided with separate and individual driving units. In Fig. 3 of the drawings is illustrated schematically a wire diagram including a power line, designated by the numeral 71, which is adapted to supply power to both motors 44 of both pairs of posts 10 and 11 and 12 and 13, respectively. There is provided in the power line 71 a switch 72 of conventional construction which has two push buttons 73 and 74 each comprising a semi-circular end portion. The push button 73 controls the supply of power to the motor 44 of the driving mechanism that serves the posts 10 and 11 and the push button 74 controls the supply of power to the motor 44 of the driving mechanism that serves the posts 12 and 13. When both of these buttons are simultaneously pressed, both driving units are operated to drive the motors in a direction to raise the load supporting seat structures 56 from the ground level, for example. The switch 72 is also provided with a pair of push buttons 76 and 77 which, like the push buttons 73 and 74, comprise semi-circular end portions that are immediately adjacent each other so that they can be simultaneously pressed. The push buttons 76 and 77 are connected and arranged in the circuits of the motors of the two driving mechanisms so as to simultaneously drive the motors 44 of the pairs of posts 10 and 11 and 12 and 13, respectively, in reverse direction so as to lower the load receiving seat structures 56 from an elevated position. When the ends of the load receiving seat portions associated with the posts 11 and 13 and 10 and 12, respectively, get out of line, they may be brought into alignment by operating one or the other of the push buttons 73, 74, 76 and 77. When the load receiving seat structures 56 reach the level of the floor 16 and are thus arrested by the floor during their downward movement, the driving mechanism may overrun with respect to the arrested load receiving seat structures by reason of the relative shifting movement which is permitted between the ring-shaped end portions 66 of the brackets 57 and the spools 50 of the nut elements 45. It will be seen that there is thus allowed sufficient time for the operator to discontinue reverse driving of the motors 44 before the lost motion allowed between the brackets 57 and nut elements 45 is fully taken up. This guards against unintended stressing of the driving mechanism or lifting structure associated with it.

In Fig. 7 of the drawings is illustrated a modified form of the invention in which substantially the same casing structure 17 is provided on posts 11 and 13, the post shown in Fig. 7 being designated by the numeral 11 for the purposes of illustration. A shaft 35 also identical to the corresponding structure of the form of the invention shown in Figs. 1 to 6 enters the casing 17 and is provided on its internal end with a bevel pinion 34 which is meshed with a bevel 33' that is, in this case, splined upon the upper end portion 78 of the screw member 31'. The spline connection between the pinion 33' and the shaft 31' takes the place of the sliding connection between the spool 50 of the nut element 45 and the bracket 57 of the form of the invention shown in Figs. 1 to 6. The nut element, generally designated by the numeral 45' in Fig. 7, is provided with collars 79 and 80 which are clampingly engaged against opposite sides of the outwardly extending ring-shaped end portion 61' of a bracket similar to the bracket 57 shown in Figs. 1 to 6, inclusive. The collars 79 and 80 are held between the flanges 51' and 52' of the spool of the nut element. When the screw of the form of the invention shown in Fig. 7 is rotated in respectively opposite directions, the nut element 45' is moved upwardly and downwardly by the thread action. When the load receiving seat structure (not shown) carried by the nut element 45' contacts the floor and is thus arrested from downward movement, further rotation of the screw 31' by the driving mechanism causes it to be screwed upwardly. This upward shifting movement of the screw is accommodated by the spline sliding connection between the screw 31' and the pinion 33' which is held against upward movement by the pinion 34 and downward movement by the thrust bearing 32'. The upper wall of the casing 17 is provided with an opening 90 through which the upper end of the screw 34' may extend. A threaded section 91 is provided on the screw 31' above the splined portion 78 and a stop nut 92 is threaded on the section 91 to engage the upper surface of the pinion 33' and hold the screw 34' against downward movement during vehicle lifting operations.

Although but several specific embodiments of the invention are herein shown and described, it will be understood that such is for the purpose of illustration only, and it is contemplated that those skilled in the art may modify certain details without departing from the spirit or scope of the invention as defined in the claims appended hereto.

I claim:

1. Vehicle hoisting apparatus comprising spaced pairs of posts between which a vehicle is widthwise receivable, a lifting unit mounted on each post comprising a screw member having a nut element threaded thereon, said nut elements being provided with vertically spaced laterally projecting abutments, a pair of driving units each mounted on one of said pairs of posts respectively and each including means operatively connecting both screw members of each of said pairs of posts respectively, a pair of load receiving seat structures each extending between two corresponding posts of said pairs of posts respectively, and means vertically shiftably mounted on and between the abutments of the nut elements of said corresponding posts for supporting the ends of said seat structures.

2. Vehicle hoisting apparatus comprising spaced pairs of hollow posts between which a vehicle is widthwise receivable, the posts of each respective pair of posts having longitudinally extending slots in their facing side wall portions, a lifting unit mounted within each post including a longitudinally extending screw member and a nut element threaded thereon, said nut elements being provided with vertically spaced laterally projecting abutments, a pair of independent driving units each mounted on one of said pairs of posts respectively and each including means operatively connecting both screw members of each of said pairs of posts respectively, a pair of load receiving seat structures each extending between two corresponding posts of said pairs of posts respectively, and means extending through said slots of said posts and vertically shiftably mounted on and between the abutments of said nut elements for supporting the ends of said seat structures on the nut elements of said corresponding posts.

3. In vehicle hoisting apparatus having lifting mechanism, a load receiving seat structure mounted on said lifting mechanism comprising a sheet metal hollow bar having a lower substantially flat floor engaging wall and an externally convexed rounded upper wall inclined continuously inwardly from the opposite outer edges of said flat side toward the mid-portion of said bar, said upper wall having a plurality of longitudinally spaced apertures therein, and vehicle contacting pad members mounted on said seat structure having lower sides concaved to fit said convexed upper wall of said seat structure and each having a downwardly extending pin receivable in one of said apertures respectively.

4. Hoisting apparatus comprising spaced pairs of hollow posts between which a vehicle to be lifted is receivable, a screw rotatably mounted in each post, a nut element threaded on each screw, a separate driving unit for simultaneously drivingly rotating the screws of each pair of posts respectively including an operative connecting member on the upper end of each screw, load receiving seat structures extending between the posts of each pair of posts respectively, connecting members on said seat structures attached to said nut elements, one of said connecting members being shiftable vertically relative to said screw for accommodating a predetermined amount of overtravel of said driving mechanism following downward movement of said seat structures to their lowermost positions.

5. Hoisting apparatus comprising spaced pairs of hollow posts between which a vehicle to be lifted is receivable, a screw rotatably mounted in each post, a nut element threaded on each screw, a separate driving unit for simultaneously drivingly rotating the screws of each pair of posts respectively including a pinion vertically shiftably splined on the upper end of each of said screws respectively, thrust bearings for holding said pinions against downward movement, and load receiving seat structures extending between the posts of each of said pairs of posts respectively having end portions mounted on the nut elements of the screws associated with said respective posts, said pinions being shiftable axially relative to the upper end portions of said screws for accommodating a predetermined overtravel of said driving mechanism after the load receiving seat structures have reached their lowermost positions.

UNITED STATES PATENTS
References Cited in the file of this patent

| | | |
|---|---|---|
| 2,099,274 | Myers | Nov. 16, 1937 |
| 2,124,726 | Blum | July 26, 1938 |
| 2,184,801 | McCarthy | Dec. 26, 1939 |
| 2,224,529 | Thompson et al. | Dec. 10, 1940 |
| 2,238,573 | Steedman | Apr. 15, 1941 |
| 2,262,833 | Clawson et al. | Nov. 18, 1941 |
| 2,593,635 | Walker | Apr. 22, 1952 |
| 2,655,223 | Villars | Oct. 13, 1953 |